US009391876B2

(12) United States Patent
Chunduri et al.

(10) Patent No.: US 9,391,876 B2
(45) Date of Patent: Jul. 12, 2016

(54) BETTER ALTERNATE PATHS FOR MULTI HOMED IS-IS PREFIXES

(71) Applicant: Telefonaktiebolaget L M Ericsson (publ), Stockholm (SE)

(72) Inventors: Uma S. Chunduri, Fremont, CA (US); Vasant S. Patil, San Jose, CA (US); Wenhu Lu, San Jose, CA (US); Evgeny Tantsura, Palo Alto, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 190 days.

(21) Appl. No.: 14/218,554

(22) Filed: Mar. 18, 2014

(65) Prior Publication Data

US 2015/0271059 A1    Sep. 24, 2015

(51) Int. Cl.
*H04L 12/707* (2013.01)
*H04L 12/721* (2013.01)
*H04L 12/705* (2013.01)
*H04L 12/745* (2013.01)
*H04L 12/715* (2013.01)

(52) U.S. Cl.
CPC ............ *H04L 45/22* (2013.01); *H04L 45/04* (2013.01); *H04L 45/12* (2013.01); *H04L 45/18* (2013.01); *H04L 45/748* (2013.01)

(58) Field of Classification Search
CPC ......... H04L 45/22; H04L 45/04; H04L 45/12; H04L 45/18; H04L 45/748
See application file for complete search history.

(56) References Cited

U.S. PATENT DOCUMENTS

| | | | |
|---|---|---|---|
| 2006/0187819 A1 | 8/2006 | Bryant et al. | |
| 2009/0279536 A1* | 11/2009 | Unbehagen | H04L 12/4625 370/352 |
| 2015/0023156 A1* | 1/2015 | Csaszar | H04L 45/22 370/228 |
| 2015/0103671 A1* | 4/2015 | Ernstrom | H04L 41/0659 370/238 |
| 2015/0222545 A1* | 8/2015 | Sarkar | H04L 45/122 370/238 |

OTHER PUBLICATIONS

RFC: 768: Postel, "User Datagram Protocol," Aug. 28, 1980, 3 pages, Network Working Group, Request for Comments: 768.
RFC 793: "Transmission Control Protocol, DARPA Internet Program Protocol Specification," Sep. 1981, 91 pages, Network Working Group, Request for Comments: 793.
RFC 1058: Hedrick, "Routing Information Protocol," Jun. 1988, 33 pages, Network Working Group, Request for Comments: 1058.

(Continued)

*Primary Examiner* — Chi H Pham
*Assistant Examiner* — Weibin Huang
(74) *Attorney, Agent, or Firm* — Nicholson De Vos Webster & Elliott, LLP

(57) ABSTRACT

A method is executed by a network device to determine a loop free alternate (LFA) for a multi-homed prefix in an IS-IS area or IS-IS domain. The method includes selecting a next node from the IS-IS area or the IS-IS domain and selecting a next prefix for the selected node. A check is made whether the selected prefix is a multi-homed prefix (MHP). A check is made whether a shortest path first (SPF) cost of the selected node and cost to the selected prefix is equal to an SPF cost of the selected prefix, whether a next hop of selected prefix is same as next hop of selected node, and whether a LFA next hop of the selected node is better protection than a current next hop protection of the selected prefix and the LFA next hop of the selected node is then inherited for the selected prefix.

17 Claims, 8 Drawing Sheets

(56) References Cited

OTHER PUBLICATIONS

RFC 1142: Oran, "OSI IS-IS Intra-domain Routing Protocol," Feb. 1990, 157 pages, Network Working Group, Request for Comments: 1142.
RFC 1180: Socolofsky, et al., "A TCP/IP Tutorial," Jan. 1991, 28 pages, Network Working Group, Request for Comments: 1180.
RFC 2080: Malkin, et al., "RIPng for IPv6," Jan. 1997, 19 pages, Network Working Group, Request for Comments: 2080.
RFC 2205: Braden, et al., "Resource ReSerVation Protocol (RSVP)—Version 1 Functional Specification," Sep. 1997, 112 pages, Network Working Group, Request for Comments: 2205.
RFC 2210: Wroclawski, "The Use of RSVP with IETF Integrated Services," Sep. 1997, 33 pages, Network Working Group, Request for Comments: 2210.
RFC 2211: Wroclawski, "Specification of the Controlled-Load Network Element Service," Sep. 1997, 19 pages, Network Working Group, Request for Comments: 2211.
RFC 2212: Shenker, et al., "Specification of Guaranteed Quality of Service," Sep. 1997, 20 pages, Network Working Group, Request for Comments: 2212.
RFC 2328: Moy, "OSPF Version 2," Apr. 1998, 244 pages, Network Working Group, Request for Comments: 2328, The Internet Society.
RFC 2453: Malkin, "RIP Version 2," Nov. 1998, 39 pages, Network Working Group, Request for Comments: 2453, The Internet Society.
RFC 2460: Deering, et al., "Internet Protocol, Version 6 (IPv6) Specification," Dec. 1998, 39 pages, Network Working Group, Request for Comments: 2460, The Internet Society.
RFC 2474: Nichols, et al., "Definition of the Differentiated Services Field (DS Field) in the IPv4 and IPv6 Headers," Dec. 1998, 20 pages, Network Working Group, Request for Comments: 2474, The Internet Society.
RFC 2475: Blake, et al., "An Architecture for Differentiated Services," Dec. 1998, 36 pages, Network Working Group, Request for Comments: 2475, The Internet Society.
RFC 2597: Heinanen, et al., "Assured Forwarding PHB Group," Jun. 1999, 11 pages, Network Working Group, Request for Comments: 2597, The Internet Society.
RFC 2675: Borman, et al., "IPv6 Jumbograms," Aug. 1999, 9 pages, Network Working Group, Request for Comments: 2675, The Internet Society.
RFC 2983: Black, "Differentiated Services and Tunnels," Oct. 2000, 14 pages, Network Working Group, Request for Comments: 2983, The Internet Society.
RFC 2991: Thaler, et al., "Multipath Issues in Unicast and Multicast Next-Hop Selection," Nov. 2000, 9 pages, Network Working Group, Request for Comments: 2991, The Internet Society.
RFC 2992: Hopps, "Analysis of an Equal-Cost Multi-Path Algorithm," Nov. 2000, 8 pages, Network Working Group, Request for Comments: 2992, The Internet Society.
RFC 3086: Nichols, et al., "Definition of Differentiated Services Per Domain Behaviors and Rules for their Specification," Apr. 2001, 24 pages, Network Working Group, Request for Comments: 3086, The Internet Society.
RFC 3140: Black, et al., "Per Hop Behavior Identification Codes," Jun. 2001, 8 pages, Network Working Group, Request for Comments: 3140, The Internet Society.
RFC 3209: Awduche, et al., "RSVP-TE: Extensions to RSVP for LSP Tunnels," Dec. 2001, 61 Pages, Network Working Group, Request for Comments: 3209, The Internet Society.
RFC 3246: Davie, et al., "An Expedited Forwarding PHB (Per-Hop Behavior)," Mar. 2002, 16 pages, Network Working Group, Request for Comments: 3246, The Internet Society.
RFC 3247: Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
RFC 3260: Grossman, "New Terminology and Clarifications for Diffserv," Apr. 2002, 10 pages, Network Working Group, Request for Comments: 3260, The Internet Society.
RFC 3289: Baker, et al., "Management Information Base for the Differentiated Services Architecture," May 2002, 116 pages, Network Working Group, Request for Comments: 3289, The Internet Society.
RFC 3290: Bernet, et al., "An Informal Management Model for Diffserv Routers," May 2002, 56 pages, Network Working Group, Request for Comments: 3290, The Internet Society.
RFC 3317: Chan, et al., "Differentiated Services Quality of Service Policy Information Base," Mar. 2003, 96 pages, Network Working Group, Request for Comments: 3317, The Internet Society.
RFC 3473: Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.
RFC 3936: Kompella, et al., "Procedures for Modifying the Resource reSerVation Protocol (RSVP)," Oct. 2004, 7 pages, Network Working Group, Request for Comments: 3936, The Internet Society.
RFC 4113: Fenner, et al., "Management Information Base for the User Datagram Protocol (UDP)," Jun. 2005, 19 pages, Network Working Group, Request for Comments: 4113, The Internet Society.
RFC 4271: Rekhter, et al., "A Border Gateway Protocol 4 (BGP-4)," Jan. 2006, 104 pages, Network Working Group, Request for Comments: 4271, The Internet Society.
RFC 4301: Kent, et al., "Security Architecture for the Internet Protocol," Dec. 2005, 101 pages, Network Working Group, Request for Comments: 4301, The Internet Society.
RFC 4309: Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
RFC 4364: Rosen, et al., "BGP/MPLS IP Virtual Private Networks (VPNs)," Feb. 2006, 47 pages, Network Working Group, Request for Comments: 4364, The Internet Society.
RFC 4495: Polk, et al., "A Resource Reservation Protocol (RSVP) Extension for the Reduction of Bandwidth of a Reservation Flow," May 2006, 21 pages, Network Working Group, Request for Comments: 4495, The Internet Society.
RFC 4558: Ali, et al., "Node-ID Based Resource Reservation Protocol (RSVP) Hello: A Clarification Statement," Jun. 2006, 7 pages, Network Working Group, Request for Comments: 4558, The Internet Society.
RFC 4594: Babiarz, et al., "Configuration Guidelines for DiffServ Service Classes," Aug. 2006, 57 pages, Network Working Group, Request for Comments: 4594, The Internet Society.
RFC 5036: Andersson, et al., "LDP Specification," Oct. 2007, 135 pages, Network Working Group, Request for Comments: 5036, The IETF Trust.
RFC 5340: Coltun, et al., "OSPF for IPv6," Jul. 2008, 94 pages, Network Working Group, Request for Comments: 5340, The IETF Trust.
RFC 5405: Eggert, et al., "Unicast UDP Usage Guidelines for Application Designers," Nov. 2008, 27 pages, Network Working Group, Request for Comments: 5405, IETF Trust and the persons identified as the document authors.
RFC 5865: Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.
RFC 6571: Filsfils, et al., "Loop-Free Alternate (LFA) Applicability in Service Provider (SP) Networks," Jun. 2012, 35 pages, Internet Engineering Task Force (IETF), Request for Comments: 6571, IETF Trust and the persons identified as the document authors.
Atlas, A., et al., "Basic Specification for IP Fast Reroute; Loop-Free Alternates", *Network Working Group, RFC 5286, Standards Track*, Sep. 2008, 32 pages., 32.
Callon, R., "Use of OSI IS-IS for Routing in TCP/IP and Dual Environments", http://tools.ietf.org/rfc/rfc1195.txt, *Digital Equipment Corp*, Dec. 1990, 80 pages.

\* cited by examiner

BETTER ALTERNATE PATHS FOR MULTI HOMED IS-IS PREFIXES

FIELD

Embodiments of the invention relate to the field of intermediate system to intermediate system (IS-IS) routing protocol. More specifically, the embodiments are related to the identification of loop free alternative paths for multi-homed prefixes in an IS-IS area or IS-IS domain that provide better protection.

BACKGROUND

RFC 1195 [IS-IS for IP Networks] is an interior gateway protocol utilized to determine the topology and routing within a network with the network divided between level 1 areas and a level 2 domain connecting the level 1 areas. IS-IS works in conjunction with a link state protocol that advertises the adjacencies of each of the nodes in an area or domain of an IS-IS network. The IS-IS protocol utilizes a route computation algorithm such as shortest path first (SPF) algorithm to calculate routes from each network device in an IS-IS area or IS-IS domain to each other network device in that area as well as routes to the border routers that enable data to be forwarded to destinations outside of the IS-IS area or IS-IS domain. Each network device in the IS-IS area or IS-IS domain constructs a routing information base in which the next hop to each other destination network device in the IS-IS area or IS-IS domain is recorded to be utilized to forward data packets.

When an adjacent router or the link to that adjacent router designated as the next hop for a route to a given destination network device fails, traffic disruption will occur until the network re-converges (i.e., recalculates paths to each of the network devices in the IS-IS area or IS-IS domain). This disruption of traffic can be prevented by Loop Free Alternatives (LFA) technology in principle as specified in RFC 5286. LFAs are alternate routes to each network device that can be utilized in the case that a next hop to a given destination is not available.

In many IS-IS areas or IS-IS domains network devices are associated with a set of prefixes, i.e., ranges of Internet Protocol addresses that are reachable from the network device. In some cases a prefix may be associated with multiple network devices, which is referred to as a 'multi-homed prefix.' This increases the complexity of calculating LFAs to these multi-homed prefixes. The specification (RFC 5286) doesn't provide a method that can be utilized to identify the best LFA in certain circumstances and in particular not with an efficient algorithm that can handle complex calculations and does not limit coverage for multi-homed prefixes. As a result, in many instances the standard LFA computation process may cause excessive and unnecessary computation for each prefix to have an optimal LFA.

SUMMARY

A method is executed by a network device to determine a loop free alternate (LFA) for a multi-honed prefix in an IS-IS area or IS-IS domain. The method includes selecting a next node from the IS-IS area or the IS-IS domain and selecting a next prefix for the selected node. A check is made whether the selected prefix is a multi-homed prefix (MHP). A check is made whether a shortest path first (SPF) cost of the selected node and cost to the selected prefix is equal to an SPF cost of the selected prefix. A check is made whether a next hop of selected prefix is same as next hop of selected node. A check is made whether a LFA next hop of the selected node is better protection than a current next hop protection of the selected prefix and the LFA next hop of the selected node is then inherited for the selected prefix.

A network device is configured to determine a loop free alternate (LFA) for a multi-homed prefix in an intermediate system—intermediate system (IS-IS) area or IS-IS domain. The network device includes a data store to store a topology of the IS-IS area or the IS-IS domain and a processor communicatively coupled to the data store. The processor is configured to execute an IS-IS module. The IS-IS module is configured to select a next node from the IS-IS area or the IS-IS domain and to select a next prefix for the selected node. The IS-IS module is further configured to check whether the selected prefix is a multi-homed prefix (MHP), to check whether a shortest path first (SPF) cost of the selected node and cost to the selected prefix is equal to an SPF cost of the selected prefix, to check whether a next hop of selected prefix is same as next hop of selected node, to check whether a LFA next hop of the selected node is better protection than a current next hop protection of the selected prefix, and to inherit the LFA next hop of the selected node by the selected prefix.

A non-transitory computer-readable medium has stored therein a set of instructions, which when executed by a network device determine a loop free alternate (LFA) for a multi-honed prefix in an intermediate system to intermediate system (IS-IS) area or the IS-IS domain. The instructions when executed causing the network device to perform a set of operations including selecting a next node from the IS-IS area or the IS-IS domain and selecting a next prefix for the selected node. A check is made whether the selected prefix is a multi-homed prefix (MHP). A check is made whether a shortest path first (SPF) cost of the selected node and cost to the selected prefix is equal to an SPF cost of the selected prefix. A check is made whether a next hop of selected prefix is same as next hop of selected node. A check is made whether a LFA next hop of the selected node is better protection than a current next hop protection of the selected prefix, and then the LFA next hop of the selected node is inherited by the selected prefix.

A control plane device is configured to implement at least one centralized control plane for a software defined network (SDN). The centralized control plane is configured to determine a loop free alternate (LFA) for a multi-honed prefix in an intermediate system to intermediate system (IS-IS) area or the IS-IS domain. The control plane device includes a storage medium to store centralized control plane software an IS-IS module and a local routing information base (RIB) and a processor communicatively coupled to the storage medium. The processor is configured to execute the centralized control plane software. The centralized control plane software implements the IS-IS module. The IS-IS module is configured to select a next node from the IS-IS area or the IS-IS domain and to select a next prefix for the selected node. The IS-IS module is further configured to check whether the selected prefix is a multi-homed prefix (MHP), to check whether a shortest path first (SPF) cost of the selected node and cost to the selected prefix is equal to an SPF cost of the selected prefix, to check whether a next hop of selected prefix is the same as the next hop of selected node. The IS-IS module is configured to check whether a LFA next hop of the selected node is better protection than a current next hop protection of the selected prefix, and to inherit the LFA next hop of the selected node by the selected prefix.

A computing device implements a plurality of virtual machines for implementing network function virtualization (NFV), wherein a virtual machine from the plurality of virtual machines is configured to determine a loop free alternate (LFA) for a multi-honed prefix in an intermediate system to intermediate system (IS-IS) area or the IS-IS domain. The computing device includes a storage medium to store centralized control plane software of an IS-IS module and a local routing information base (RIB) and a processor communicatively coupled to the storage medium. The processor configured to execute the virtual machine, where the virtual machine is configured to execute the IS-IS module. The IS-IS module is configured to select a next node from the IS-IS area or the IS-IS domain, to select a next prefix for the selected node, to check whether the selected prefix is a multi-homed prefix (MHP), to check whether a shortest path first (SPF) cost of the selected node and cost to the selected prefix is equal to an SPF cost of the selected prefix, to check whether a next hop of selected prefix is same as next hop of selected node, to check whether a LFA next hop of the selected node is better protection than a current next hop protection of the selected prefix, and to inherit the LFA next hop of the selected node by the selected prefix.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
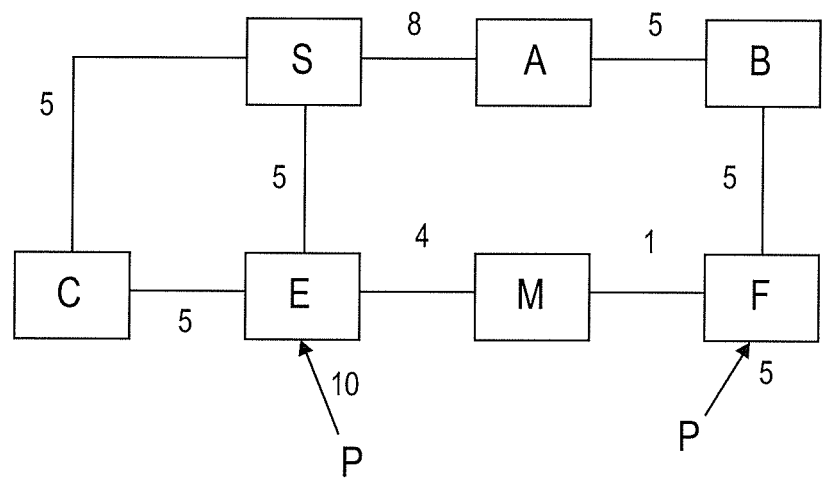
FIG. 1 is an example network topology in which LFAs are calculated for multi-homed prefixes.

The following description describes methods and apparatus for the identification of loop free alternative paths for multi-homed prefixes in an IS-IS area or IS-IS domain that provide better protection. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Overview

While computing loop free alternatives (LFA) as part of the IS-IS convergence process, to get the coverage for the multi-homed prefixes a procedure is described by RFC 5286 is Section 6.1.—"Multi-Homed Prefixes." As per RFC 5286, Section 6.1 specifies a two ways to handle multi-homed prefixes alternative path computations as described therein: "To determine the best protection possible, the prefix p can be treated in the SPF computations as a node with unidirectional links to it from those routers that have advertised the prefix. Such a node need never have its links explored, as it has no out-going links." In any typical network the number of multi-homed prefixes is in general less than the total prefixes in the network and the RFC 5286 procedure is applied to all the prefixes in the network, it will significantly increase the computation burden of the computing router.

This first approach described by RFC 5286 is a process that has two significant consequences, (1) it is asking the process to consider every prefix as a node in the topology (where IS-IS SPF ISO 10586 Appendix F, only considers systems or routers as nodes in the graph). Though this is possible it introduces an extra level of heap expansion in SPF from the leaf nodes. Second (2), with redistribution and inter-area leaking cases in big deployments (i.e., those with a lot of links and hundreds of nodes) the number of IP prefixes can be in tens of thousands and hence computation time for each SPF can be quickly increased and this gets multiplied with lot of neighboring links.

In a second approach, the RFC 5286 indicates "In all cases, a router MAY safely simplify the multi-homed prefix (MHP) calculation by assuming that the MHP is solely attached to the router that was its pre-failure optimal point of attachment. However, this may result in a prefix not being considered repairable, when the full computation would show that a repair was possible." While this second simplified approach to compute alternate paths for multi-homed prefixes is a scalable approach in the spirit of the IS-IS primary SPF computation, this approach can result in lower coverage for multi-homed prefixes.

The process described herein overcomes the disadvantages of the prior art, where loop free equal cost multi-path alternatives from the shortest path first (SPF) calculation for multi-homed prefixes are reconsidered during loop free alternative (LFA) computation to determine whether better coverage can be found than that which is offered by LFA computed as described in RFC 5286 Section 6.1 without increasing the overall computational requirements in the manner that the prior art requires.

The processes for determining LFA with better protection for multi-homed prefixes for an IS-IS area or IS-IS domain that are described herein below can be applied for Internet Protocol version 4 (IPv4) and/or Internet Protocol version 6 (IPv6) routes and topologies. The process can be applied to each (IPv4 and IPv6) in any order or in parallel. The processes for handling each (IPv4 and IPv6) are similar and for sake of clarity are not separately addressed.

FIG. 1 is a diagram of an example network topology that illustrates a case where the LFA computation process that checks nodes that are ECMP attached nodes for a prefix to determine whether they offer better protection than the computation of RFC 5286. In the example network topology, the nodes are illustrated as boxes and links between the nodes are illustrated with their link cost. The example is illustrated from the perspective of node S (i.e., the source node). The source node is connected with nodes A, C and E. Each of the nodes in the network is associated with a set of Internet Protocol (IP) addresses identified by 'prefixes' that identify a range of IP addresses that are reachable from the node. In this example topology, there is a prefix 'P' that is advertised by two nodes in the network as being reachable via those nodes. The prefix P is thus a multi-homed prefix that is reachable from multiple nodes.

In the above network, the prefix P is advertised from both node E and node F. With the simplified approach taken as specified in RFC 5286 Section 6.1 Page 22 Last Paragraph (i.e., described above as the second approach), prefix P will get only link protection LFA through the neighbor C while a node protection path is available through neighbor A. Specifically, prefix P has primary a next hop E with cost to reach P via E of 15, where the cost to traverse the topology (i.e., the link from S to E) is 5 and the cost to reach prefix P from attached node E is 10. The LFA next hop for reaching node E is C using this approach. However, this only offers link protection, i.e., it satisfies only inequality 1, RFC 5286. Prefix P also is reachable through a different node, Node F. Node F has primary next hop of E and it has a node protection LFA through link connecting Node A. Hence, because prefix P is connected to node A it is possible to get a node protection LFA. But as per RFC 5286 (Section 6.1 Page 22 Last Paragraph), prefix P can only get link protection LFA through link connecting node C.

Figure 2:
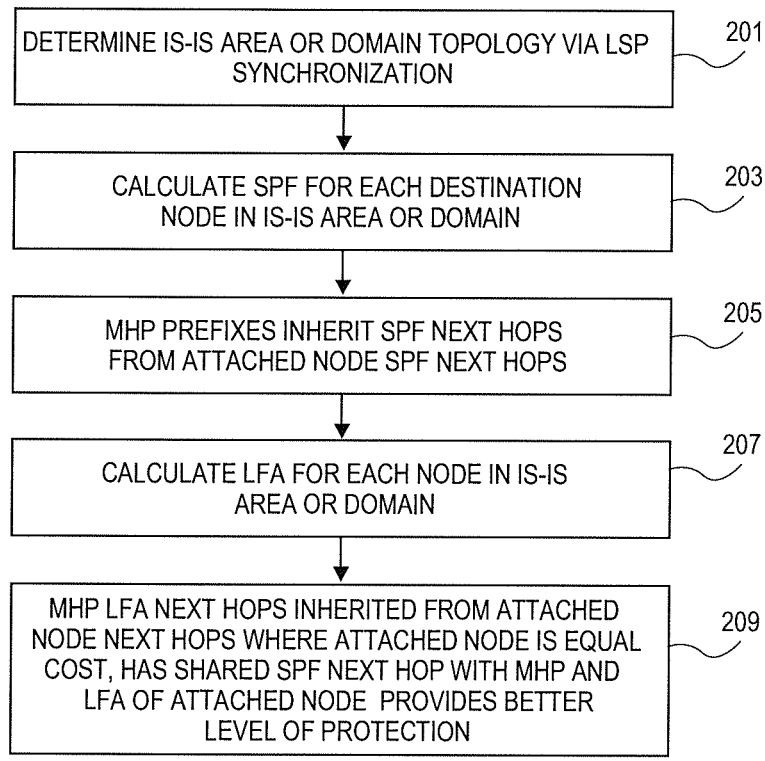
FIG. 2 is a flowchart of one embodiment of an IS-IS convergence process including an LFA computation process for improved protection of multi-homed prefixes.
Figure 3:
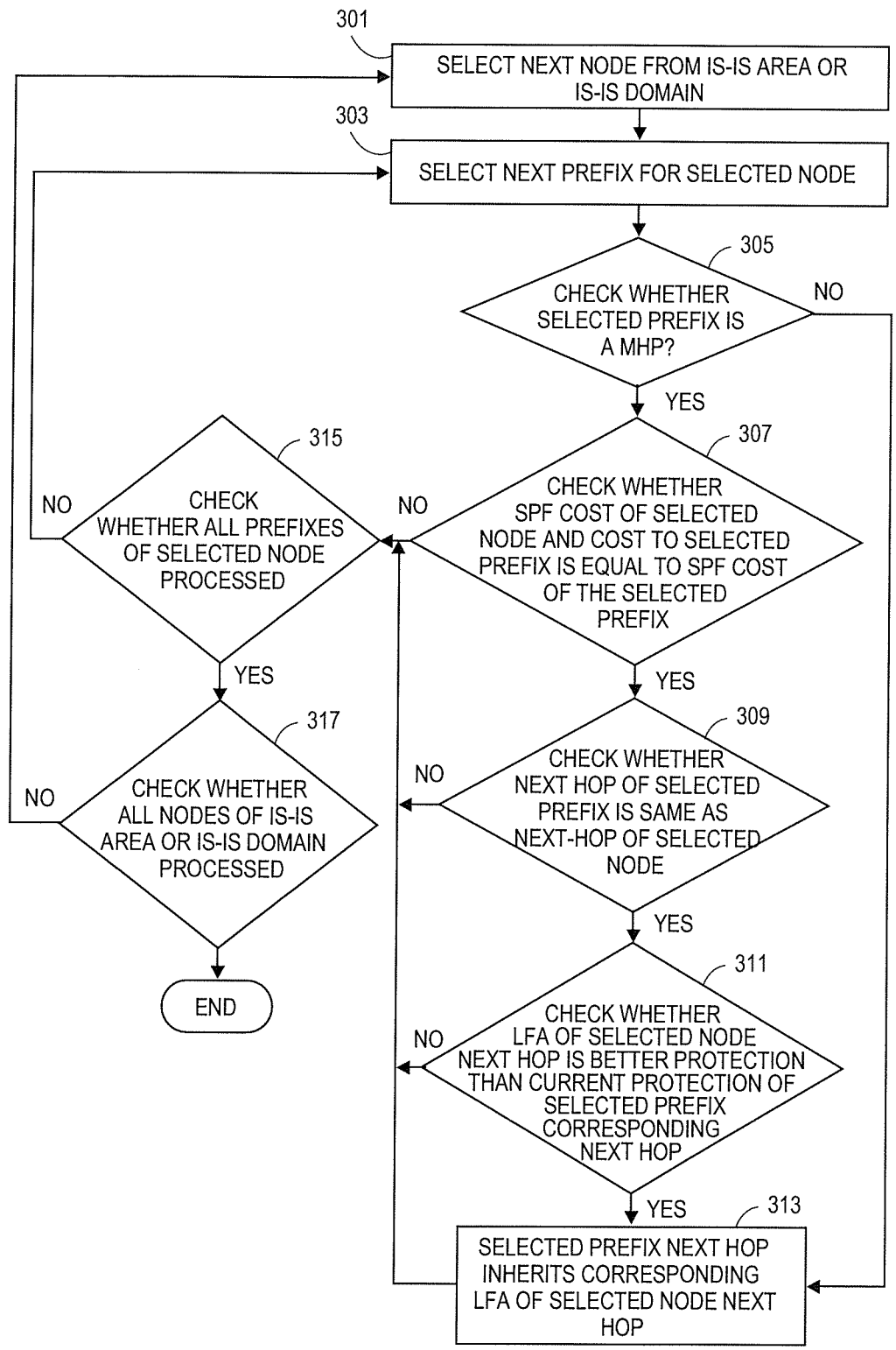
FIG. 3 is a flowchart of one embodiment of a process for identifying nodes attached to the multi-homed prefixes that provide a higher level of protection when the LFA is inherited from these nodes.

This example clearly demonstrates the case where via node F an LFA can be found to prefix P, even though the primary point of attachment for prefix P is node E. In summary, RFC 5286 does not provide any description of handling scenarios where there are multiple pre-failure points of attachment for a multi-homed prefix (MHP). The processes described below with regard to FIGS. 2 and 3 provide better protection to MHP. In the above example, nodes E and F are both optimal points of attachment. Hence we can compare the "the kind of protection A provides to F" (link-and-node protection) with "the kind of protection C provides to E" (link protection) and inherit the better one to prefix P. In this example case the protection of A for F is better.

As explained herein above section, prefix P could have a node protection LFA without having to check any inequalities (as set forth in RFC 5286) and without causing any loops. This is possible due to the use of the loop-free ECMP path of the primary SPF. By recognizing that prefix P has not only a link to node E as a primary next hop, but that prefix P also has ECMP through the same link to node E and node F. While this path via node F is not used in the primary SPF, because it has the same primary next hop; the process described below will demonstrate that this can be used for determining an LFA next hop for a MHP.

FIG. 2 is a flowchart of one embodiment of an IS-IS convergence process including the LFA computation process for an IS-IS network area or domain that evaluates ECMP next hops from the SPF computation. In one embodiment, the convergence process begins with the determination of adjacencies with neighboring nodes using the IS-IS protocol to build an adjacency database. The process continues with the exchange and receiving of link state packets according to the link state protocol (LSP) from each network device in the IS-IS area or IS-IS domain as described in RFC 1195 (Block 201) thereby synchronizing the link state protocol database between the network devices in the IS-IS area or IS-IS domain.

This link state data is utilized to construct a topology of the IS-IS area or IS-IS domain in the local link state protocol database. Using this data, each of the network devices in the IS-IS area or IS-IS domain can determine routing to each of the other network devices in the IS-IS area or IS-IS domain using a routing algorithm such as the shortest path first (SPF) algorithm or similar routing algorithm (Block 203). A next hop for reaching each of the destination network devices in the IS-IS area or IS-IS domain is recorded in the local routing information base (RIB) to be utilized to forward packets to a given destination. Multi-homed prefixes then inherit (i.e., are assigned) the same SPF next hop as determined for the attached node (i.e., the SPF next hop of the attached node). As described above, the 'attached' node for a multi-homed prefix is the node that is first encountered in SPF (i.e., the shortest distance) that advertises the MHP. In some cases however, there are ECMP nodes that are also attached to the MHP with the same (primary) SPF next hop, however, they are not utilized by the SPF computation.

The process then continues after all of the primary paths to the other network devices in the IS-IS area or IS-IS domain have been computed and the MHP inherit their next hops by computing loop free alternative paths (LFA) to each of the network devices in the IS-IS area or IS-IS domain (Block 207). The LFA can be calculated using the process defined in RFC 5286. The LFA next hops for each destination node can then be recorded in the local RIB to be utilized in the case of a link or node failure associated with the next hop of the primary path to a given destination. The calculation of LFAs would normally under RFC 5286 then be followed by each MHP inheriting the LFA next hop of the primary SPF attached node. However, as described further herein below with regard to FIG. 3, the MHP LFA next hop is now inherited from the attached node next hop where the attached node is an equal cost (with the SPF attached node), has a shared SPF next hop with the MHP SPF next hop and the LFA of the attached node provides a better level of protection than the LFA of the primary SPF attached node (Block 209). A 'better' level of protection includes providing link protection where the primary SPF attached node provides no protection or providing node protection where the SPF attached node provides no protection or only link protection.

FIG. 3 is a flowchart of one embodiment of an LFA computation process that examines the equal cost attached nodes for a multi-homed prefix in an IS-IS area or IS-IS domain. In one embodiment, the process relies on the prior calculation of SPF next hops for the IS-IS area or IS-IS domain topology with the computing network as well as the inheriting of these next hops by the multi-homed prefixes. The process can begin with the selection of a node from the IS-IS area or domain (Block 301). The process can traverse the network topology in any order. In one embodiment, the traversal can begin from the source node and proceed in a depth first, breadth first or similar traversal pattern. The process then selects a prefix associated with the selected node (Block 303). Similarly, the prefixes associated with a selected node can be processed in any order.

A series of checks are then made to examine the prefix and determine a best LFA next hop for the prefix. The prefix is first checked to determine whether it is a multi-homed prefix (MHP) (Block 305). A prefix can be check for being a MHP by searching a local RIB for additional occurrences of the prefix with other nodes; the MHP can have been previously identified during SPF or through a similar process. If the prefix is not an MHP, then the standard process of inheriting an LFA next hop for a prefix next hop from the selected node and its corresponding LFA (Block 313).

However, if the prefix is an MHP, then the process continues to attempt to identify the best LFA next hop by determining whether the currently selected node provides a better path (i.e., next hop) to the MHP. A check is made whether the SPF cost of the selected node (i.e., the cost to reach the selected node from the source node) and the cost to the selected prefix (i.e., the cost from the selected node to the selected prefix) is equal to the current SPF cost of the selected prefix (i.e., the cost to reach the selected prefix determined from examining other attached nodes in earlier iterations of this process or a default starting value) (Block 307). In other words, the check is to determine if the selected node provides an ECMP to the prefix. If the cost is not equal, the selected node does not offer a better path for the selected prefix, then a check is made to determine if other prefixes associated with the node remain to be examined (Block 315). If so then next prefix is selected (Block 303). If no prefixes remain to be processed, then a check is made whether additional nodes remain to be processed (Block 317). If all nodes and prefixes have been exhausted then the process completes with the best LFA next hop for each node and MHP having been discovered. This iterative process is provided by way of example and not limitation. One skilled in the art would understand that other iterative or similar traversal processes can be utilized to examine each node and each of the nodes prefixes to ensure that the best LFA next hop is determined for each.

Where the cost check did indicate an equal cost (Block 307), a further check is made whether the SPF next hop of the selected prefix is the same as the SPF next hop of the selected node (Block 309). This indicates that the selected node has a same SPF path as the SPF attached node of the prefix. If this is not the case, then checks for the next prefix (Block 315) and node (Block 317) can be made or the process ended as discussed above. If the SPF next hops do match, the a check is made whether the LFA next hop of selected node provides better protection (as discussed above) than the current protection of the next hop of the selected prefix (Block 311). If this is true, then the better LFA next hop of the selected node is selected to be inherited (i.e., assigned) as the next hop of the selected prefix (Block 313). The process then continues to check additional prefixes (Block 315) and nodes (Block 317) until the process completes and the best next hop LFA for each MHP then are produced as the final LFA next hops as a result of this process. An example illustration is given with relation to FIG. 1, herein below.

The above procedure can be applied to identify better protection for MHP in an IS-IS area or domain. For example, during primary SPF computation rooted at source node S, node E is encountered first and prefix P would get the next hop as the link connecting node S to node E with cost of 15 to reach prefix P. While further computing the SPF node F would be reached and while examining the node F's LSP prefix P is encountered. However, the cost to reach prefix P is same (15) and also the next hop is the same (i.e., the link to node E from source node S). While this is redundant information for primary SPF computation, this can be valuable for identifying better LFA. The primary SPF process can record this equal cost path (i.e., the next hop and the node identifier (ID) from where this prefix P is advertised. During subsequent LFA computation rooted at neighbor C—node E will get a link protection LFA (i.e., the link connecting node S to node C) and therefore the prefix P also receives this same link protection.

While computing LFA rooted at node A, node F will get a node protection LFA from the link connecting to node A and this can then be safely given to prefix P by making the checks defined above using the information previously stored. With this process all the operator choices of the LFA provisioned at the link connecting to E (primary next hop for P) are automatically taken care of Thus, LFAs computed for pre-failure optimal points of attachments (i.e., multiples of them) can be compared directly and can be inherited for the better one to the MHP; if the primary next hop of pre-failure point of attachment is same as that of MHP primary next hop.

To generalize this, the two conditions need to be verified are as follows: condition (1) the node for which we are computing LFAs is the pre-failure optimal point of attachment for the MHP, and condition (2) the primary SPF next hop of an MHP is the same as that of the primary SPF next hop of the node that was the pre-failure optimal point of attachment. To elaborate this point, consider the following notation: S→Source (point of local repair (PLR)), N1, D1 . . . Dn →nodes in the network where N1 (or 'Nx') represents the immediate neighbor of the source node (PLR), where D1 . . . Dn represent any nodes in the network, and P→MHP. During LFA computation, if S→N1→D1 . . . →Dn→P is one of the pre-failure optimal paths to MHP P, and primary SPF next hop of Dn matches with primary SPF next hop of P, P can inherit Dn's LFAs if it's better that already existing LFA for that next hop. A proof of correctness by contradiction follows: Let's assume there is node N2 that provides link protection to Dn. That is there is an assumption: Opt_Dist (N2, Dn)<Opt_Dist (N2, S)+Opt_Dist (S, Dn), where Opt_Dist (X,Y) is a function that outputs the shortest distance from node X to node Y. However, it does NOT provide link-protection to P. Opt_Dist (N2, P)>Opt_Dist (N2, S)+Opt_Dist (S, P)→and Opt_Dist (N2, P) can be expanded as Opt_Dist (N2, Dn)+Opt_Dist (Dn, P)>Opt_Dist (N2, S)+Opt_Dist (S, P)→and Opt_Dist (S, P) can be further expanded from Condition 1: Opt_Dist (N2, Dn)+Opt_Dist (Dn, P)>Opt_Dist (N2, S)+Opt_Dist (S, Dn)+Opt_Dist (Dn, P). If Opt_Dist (Dn, P) is taken out from both sides, then Opt_Dist (N2, Dn)>Opt_Dist (N2, S)+Opt_Dist (S, Dn). This contradicts our assumption. Hence, the process is proved. Similarly, a proof for node protection inequality can be provided Thus, a process has been described for determining LFA next hops for MHP, with the advantages of (in certain topologies) not sacrificing any performance, and not without losing the operator preferences provisioned at primary SPF next hop for MHPs. Multi homed Prefixes (MHP) can get better alternate paths through the procedure discussed herein above.

Figure 4:
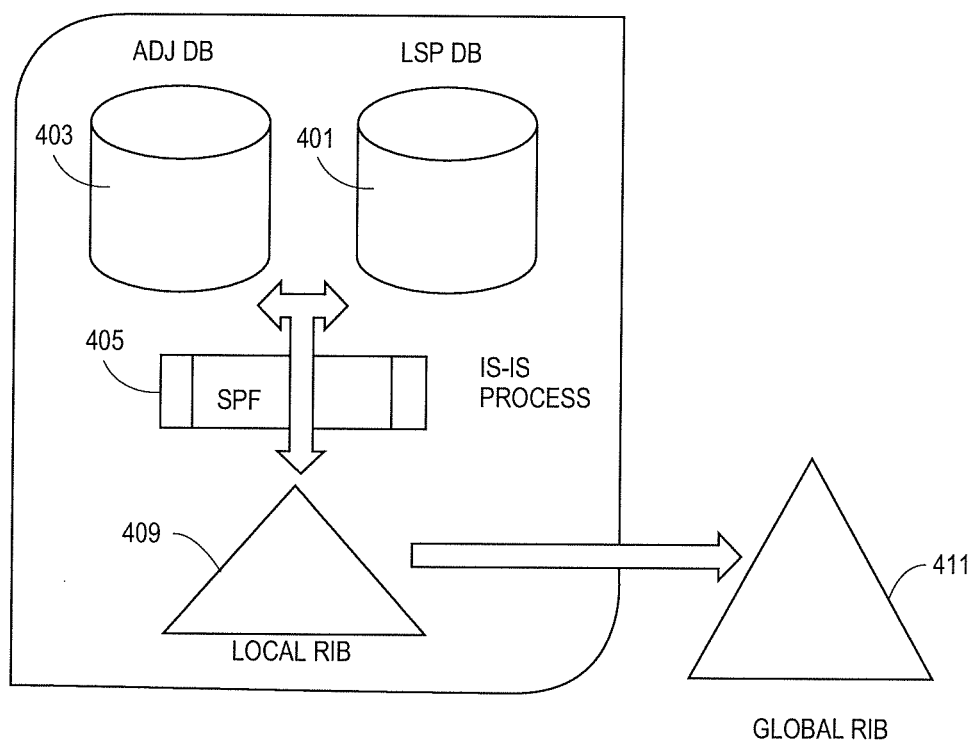
FIG. 4 is a diagram of the basic components of the IS-IS process.

FIG. 4 is a diagram of the basic components of the IS-IS process. The components of the network device that are utilized in the IS-IS process include an adjacency (ADJ) database 403, a link state protocol (LSP) database 401, a shortest path first (SPF) 405 or similar routing process, and a local RIB 409. The adjacency database 403 tracks adjacency information received from neighboring nodes connected through the physical ports and links of the network device. The link state protocol database 401 tracks the topology of the IS-IS area or IS-IS domain in which the network device is situated, which is based on exchange of link state packets. A shortest path first 405 or similar route computation algorithm processes the link state protocol database 401 to determine forwarding information that is stored in the local routing information base 409. In some embodiments, the local routing information base is synchronized or downloaded to a global routing information base 411 that is shared by all components of the network device such as line cards and similar components or that may be shared with other network devices in the IS-IS area or IS-IS domain.

Figure 5:
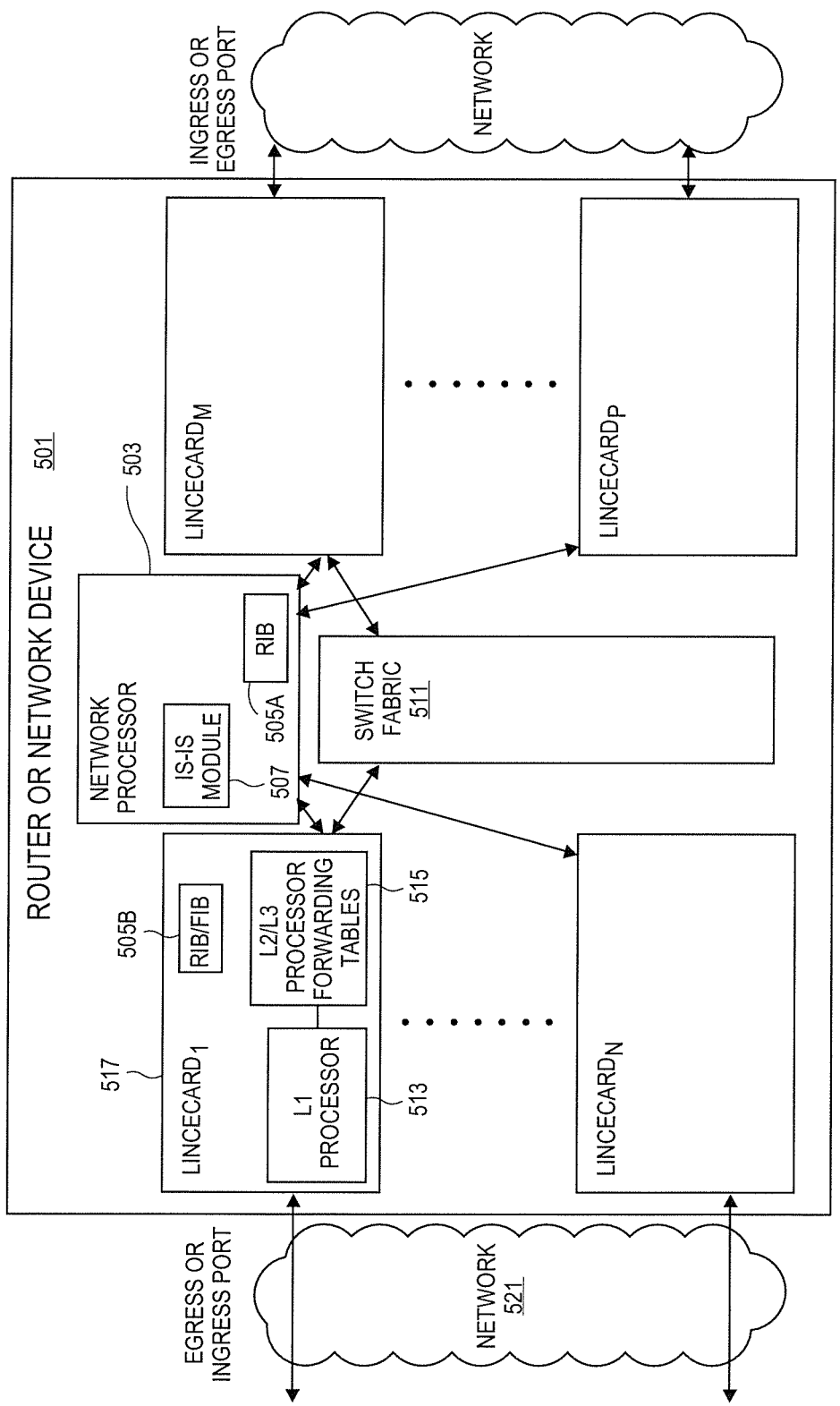
FIG. 5 is a diagram of one embodiment of a network device implementing the LFA computation process for default routes in an IS-IS network area.

FIG. 5 is a diagram of one embodiment of a network device implementing the LFA computation process described herein above in an IS-IS area or IS-IS domain.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a router 501 or network device or similar computing device. The router 501 can have any structure that enables it to receive data traffic and forward it toward its destination. The router 501 can include a network processor 503 or set of network processors that execute the functions of the router 501. A 'set,' as used herein, is any positive whole number of items including one item. The router 501 or network element can execute IS-IS process functionality via a network processor 503 or other components of the router 501.

The IS-IS process functions can be implemented as modules in any combination of software, including firmware, and hardware within the router. The functions of the IS-IS process that are executed and implemented by the router 501 include those described further herein above.

In one embodiment, the router 501 can include a set of line cards 517 that process and forward the incoming data traffic toward the respective destination nodes by identifying the destination and forwarding the data traffic to the appropriate line card 517 having an egress port that leads to or toward the destination via a next hop. These line cards 517 can also implement the routing information base or forwarding information base 505B, or a relevant subset thereof. The line cards 517 can also implement or facilitate the IS-IS process functions described herein above. The line cards 517 are in communication with one another via a switch fabric 511 and communicate with other nodes over attached networks 521 using Ethernet, fiber optic or similar communication links and media.

In other embodiments, the processes can be implemented by a split-architecture node, where the control plane is remote from the data/forwarding plane. In this case, the IS-IS processes can be carried out at any combination of the data plane nodes and the central controller.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

Figures 6A, 6B:
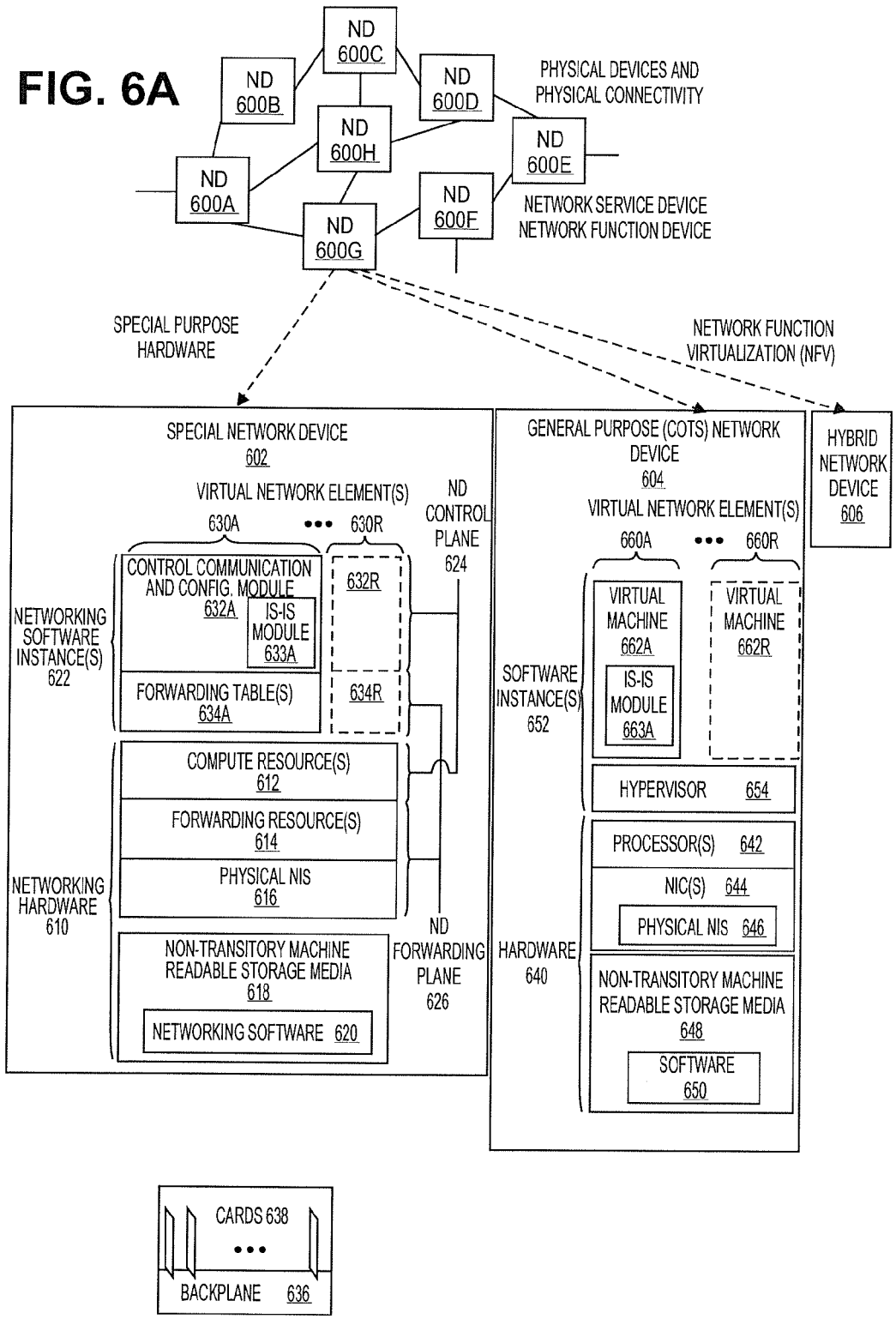
FIG. 6A illustrates connectivity between network devices (NDs) within an exemplary network, as well as three exemplary implementations of the NDs, according to some embodiments of the invention.
FIG. 6B illustrates an exemplary way to implement the special-purpose network device 602 according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link) An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application—specific integrated—circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). The IS-IS module 633A implements the processes described herein above as part of the Control communication and Configuration Module 632A or similar aspect of the networking software, which may be loaded and stored in the non-transitory machine readable media 618A or in a similar location.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporarily shared by that virtual machine with others of the virtual machine(s) 662A-R), forms a separate virtual network element(s) 660A-R. In one embodiment, the virtual machines 632A-R may execute the described IS-IS module 663A and related software described herein above.

The virtual network element(s) 660A-R perform similar functionality to the virtual network element(s) 630A-R. For instance, the hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 6C:
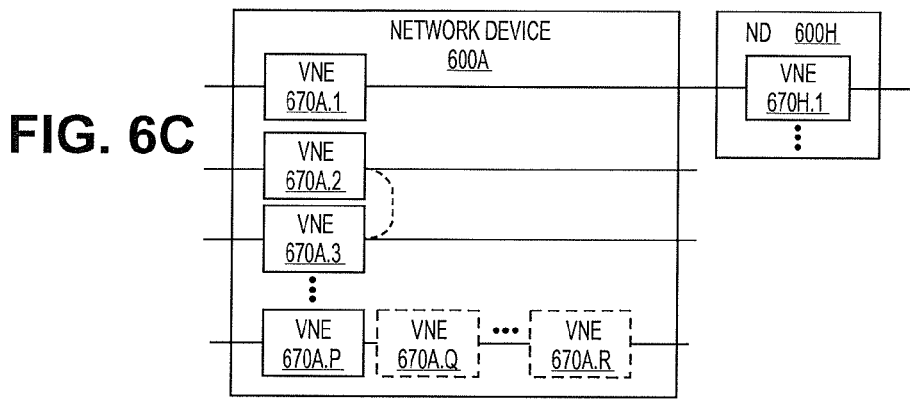
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 680A.Q-680A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the virtual machines 662A-R may operate as servers; the same would be true for the hybrid network device 606; in the case of the special-purpose network device 602, one or more such servers could also be run on a hypervisor executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multi-protocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 6D:
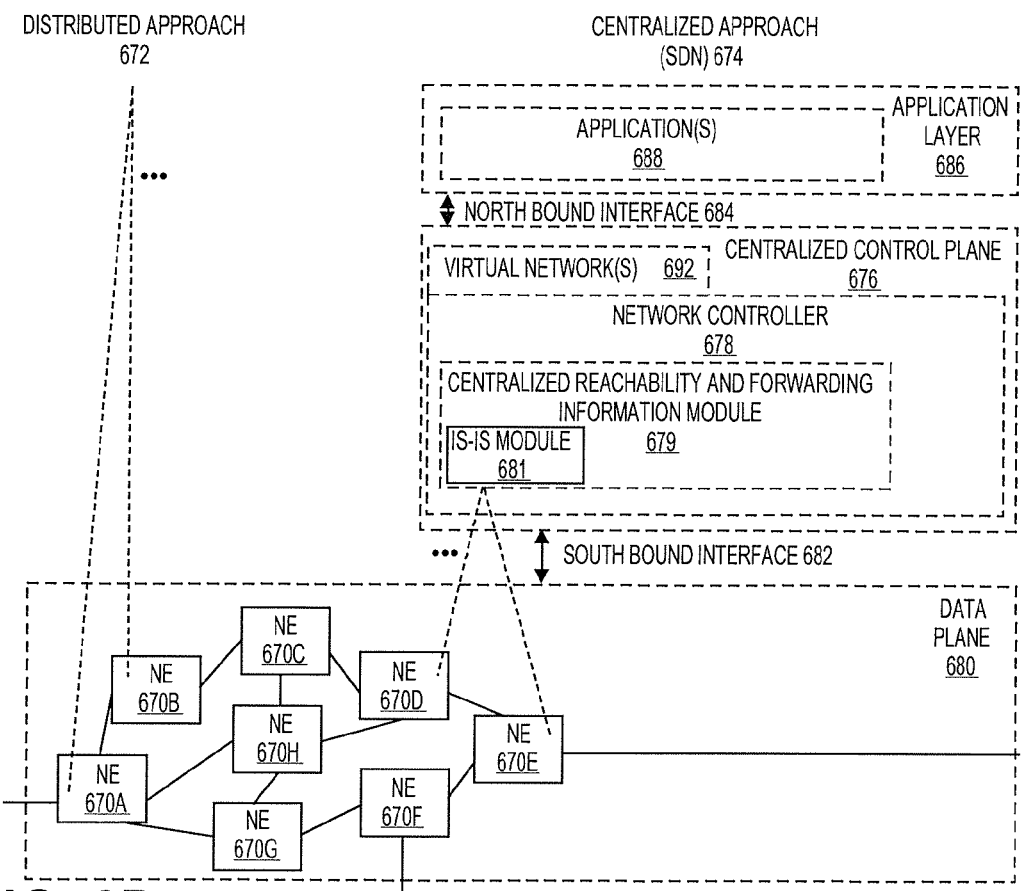
FIG. 6D illustrates a network with a single network element (NE) on each of the NDs of FIG. 6A, and within this straight forward approach contrasts a traditional distributed approach (commonly used by traditional routers) with a centralized approach for maintaining reachability and forwarding information (also called network control), according to some embodiments of the invention.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 172 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to as the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane CA80 over the south bound interface 682 (which may use the OpenFlow protocol). Thus, the network intelligence is centralized in the centralized control plane 676 executing on electronic devices that are typically separate from the NDs. In one embodiment, the centralized reachability and forwarding information module 679 may include the IS-IS module 681 and related software as described herein above.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 174 can be implemented with the general purpose network device 604 (e.g., each of the VNE XA60A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 6A60A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
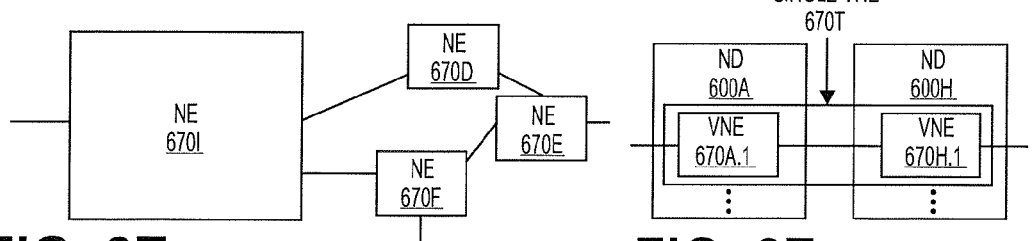
FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments of the invention.
Figure 6F:
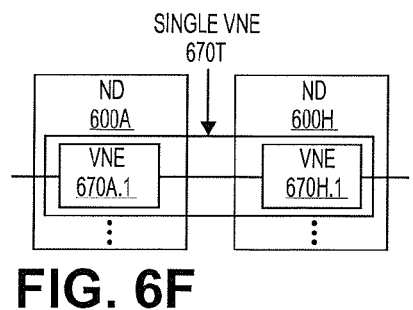
FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
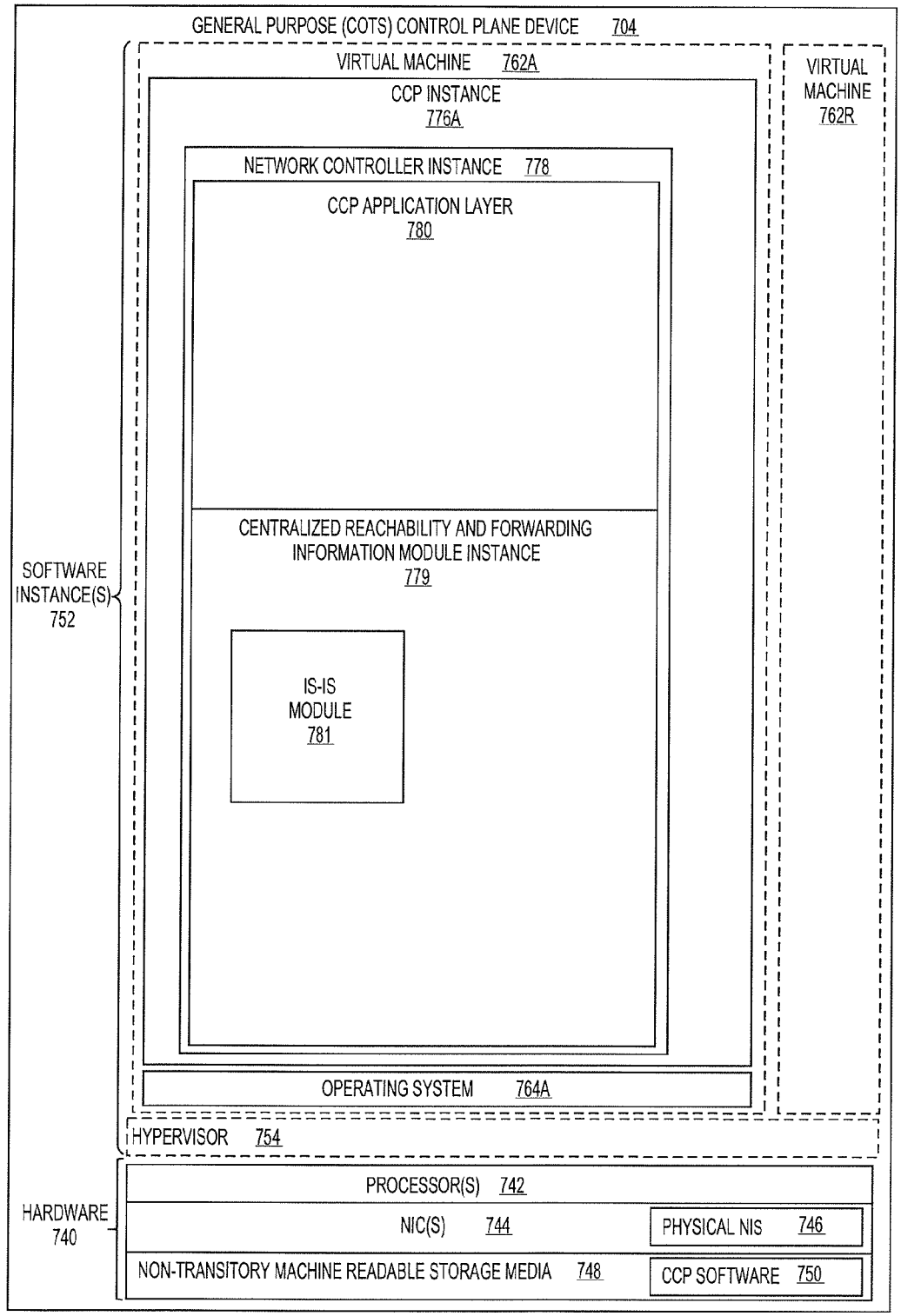
FIG. 7 illustrates a general purpose control plane device 704 including hardware 740 comprising a set of one or more processor(s) 742 (which are often Commercial off-the-shelf (COTS) processors) and network interface controller(s) 744 (NICs; also known as network interface cards) (which include physical NIs 746), as well as non-transitory machine readable storage media 748 having stored therein centralized control plane (CCP) software 750), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a hypervisor 754 (sometimes referred to as a virtual machine monitor (VMM)) and one or more virtual machines 762A-R that are run by the hypervisor 754; which are collectively referred to as software instance(s) 752. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 750 (illustrated as CCP instance 776A) on top of an operating system 764A are typically executed within the virtual machine 762A. In embodiments where compute virtualization is not used, the CCP instance 776A on top of operating system 764A is executed on the "bare metal" general purpose control plane device 704.

The operating system 764A provides basic processing, input/output (I/O), and networking capabilities. In some embodiments, the CCP instance 776A includes a network controller instance 778. The network controller instance 778 includes a centralized reachability and forwarding information module instance 779 (which is a middleware layer providing the context of the network controller 678 to the operating system 764A and communicating with the various NEs), and an CCP application layer 780 (sometimes referred to as an application layer) over the middleware layer (providing the intelligence required for various network operations such as protocols, network situational awareness, and user-interfaces). In one embodiment, the centralized reachability and forwarding information module 779 may include the IS-IS module 781 and related software as described herein above. At a more abstract level, this CCP application layer 780 within the centralized control plane 676 works with virtual network view(s) (logical view(s) of the network) and the middleware layer provides the conversion from the virtual networks to the physical view.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method executed by a network device to determine a loop free alternate (LFA) for a multi-homed prefix in an intermediate System—intermediate system (IS-IS) area or IS-IS domain, the method comprising the steps:
    selecting a next node from the IS-IS area or the IS-IS domain;
    selecting a next prefix for the selected node;
    checking whether the selected prefix is a multi-homed prefix (MHP);
    checking whether a shortest path first (SPF) cost of the selected node and cost to the selected prefix is equal to an SPF cost of the selected prefix;
    checking whether a next hop of selected prefix is same as next hop of selected node;
    checking whether a LFA next hop of the selected node is better protection than a current next hop protection of the selected prefix;
    inheriting the LFA next hop of the selected node for the selected prefix; and
    recording the LFA next hop as a next hop for the MHP in the routing information base (RIB) of the network device.

2. The method of claim 1, further comprising the step of: calculating the SPF for each node of each topology in the IS-IS area or the IS-IS domain.

3. The method of claim 2, further comprising the step of: inheriting the SPF next hop of attached nodes for each MHP in the IS-IS area or the IS-IS domain.

4. The method of claim 1, further comprising the step of: calculating an LFA for each node in IS-IS area or the IS-IS domain.

5. The method of claim 1, further comprising:
    checking whether all prefixes of the selected node have been processed to inherit an LFA next hop.

6. The method of claim 1, further comprising:
    checking whether all nodes in the IS-IS area or the IS-IS domain have been processed to determine LFA next hop for each advertised prefix.

7. The method of claim 1, wherein the selected prefix is a portion of an Internet Protocol (IP) address designating a subset of IP addresses, where the prefix is an IP version 4 (IPv4) or IP version 6 (IPv6) prefix.

8. A network device configured to determine a loop free alternate (LFA) for a multi-homed prefix in an intermediate system-intermediate system (IS-IS) area or IS-IS domain, the network device comprising:
    a data store to store a topology of the IS-IS area or the IS-IS domain; and
    a processor communicatively coupled to the data store, the processor configured to execute an IS-IS module, the IS-IS module configured to select a next node from the IS-IS area or the IS-IS domain, to select a next prefix for the selected node, to check whether the selected prefix is a multi-homed prefix (MHP), to check whether a shortest path first (SPF) cost of the selected node and cost to the selected prefix is equal to an SPF cost of the selected prefix, to check whether a next hop of selected prefix is same as next hop of selected node, to check whether a LFA next hop of the selected node is better protection than a current next hop protection of the selected prefix, and to inherit the LFA next hop of the selected node by the selected prefix.

9. The network device of claim 8, wherein the IS-IS module is further configured to calculate the SPF for each node of each topology in the IS-IS area or the IS-IS domain.

10. The network element of claim 9, wherein the IS-IS module is further configured to inherit the SPF next hop of attached nodes for each MHP in the IS-IS area or the IS-IS domain.

11. The network element of claim 8, wherein the IS-IS module is further configured to calculate an LFA for each node in IS-IS area or the IS-IS domain.

12. The network element of claim 8, wherein the IS-IS module is further configured to check whether all prefixes of the selected node have been processed to inherit an LFA.

13. The network element of claim 8, wherein the IS-IS module is further configured to check whether all nodes in the IS-IS area or the IS-IS domain have been processed to determine LFA for each advertised prefix.

14. The network element of claim 8, wherein the selected prefix is a portion of an Internet Protocol (IP) address designating a subset of IP addresses, where the prefix an IP version 4 (IPv4) or IP version 6 (IPv6) prefix.

15. A non-transitory computer-readable medium having stored therein a set of instructions, which when executed by a network device determine a loop free alternate (LFA) for a multi-homed prefix in an intermediate system to intermediate system (IS-IS) area or the IS-IS domain, the instructions when executed causing the network device to perform a set of operations comprising:
  selecting a next node from the IS-IS area or the IS-IS domain;
  selecting a next prefix for the selected node;
  checking whether the selected prefix is a multi-homed prefix (MHP);
  checking whether a shortest path first (SPF) cost of the selected node and cost to the selected prefix is equal to an SPF cost of the selected prefix;
  checking whether a next hop of selected prefix is same as next hop of selected node;
  checking whether a LFA next hop of the selected node is better protection than a current next hop protection of the selected prefix; and
  inheriting the LFA next hop of the selected node by the selected prefix.

16. A control plane device configured to implement at least one centralized control plane for a software defined network (SDN), the centralized control plane configured to determine a loop free alternate (LFA) for a multi-homed prefix in an intermediate system to intermediate system (IS-IS) area or the IS-IS domain, the control plane device comprising:
  a storage medium to store centralized control plane software an IS-IS module and a local routing information base (RIB); and
  a processor communicatively coupled to the storage medium, the processor configured to execute the centralized control plane software, the centralized control plane software to implement the IS-IS module, the IS-IS module configured to select a next node from the IS-IS area or the IS-IS domain, to select a next prefix for the selected node, to check whether the selected prefix is a multi-homed prefix (MHP), to check whether a shortest path first (SPF) cost of the selected node and cost to the selected prefix is equal to an SPF cost of the selected prefix, to check whether a next hop of selected prefix is same as next hop of selected node, to check whether a LFA next hop of the selected node is better protection than a current next hop protection of the selected prefix, and to inherit the LFA next hop of the selected node by the selected prefix.

17. A computing device implementing a plurality of virtual machines for implementing network function virtualization (NFV), wherein a virtual machine from the plurality of virtual machines is configured to determine a loop free alternate (LFA) for a multi-homed prefix in an intermediate system to intermediate system (IS-IS) area or the IS-IS domain, the computing device comprising:
  a storage medium to store centralized control plane software an IS-IS module and a local routing information base (RIB); and
  a processor communicatively coupled to the storage medium, the processor configured to execute the virtual machine, where the virtual machine is configured to execute the IS-IS module, the IS-IS module configured to select a next node from the IS-IS area or the IS-IS domain, to select a next prefix for the selected node, to check whether the selected prefix is a multi-homed prefix (MHP), to check whether a shortest path first (SPF) cost of the selected node and cost to the selected prefix is equal to an SPF cost of the selected prefix, to check whether a next hop of selected prefix is same as next hop of selected node, to check whether a LFA next hop of the selected node is better protection than a current next hop protection of the selected prefix, and to inherit the LFA next hop of the selected node by the selected prefix.

* * * * *